United States Patent Office 3,208,157
Patented Sept. 28, 1965

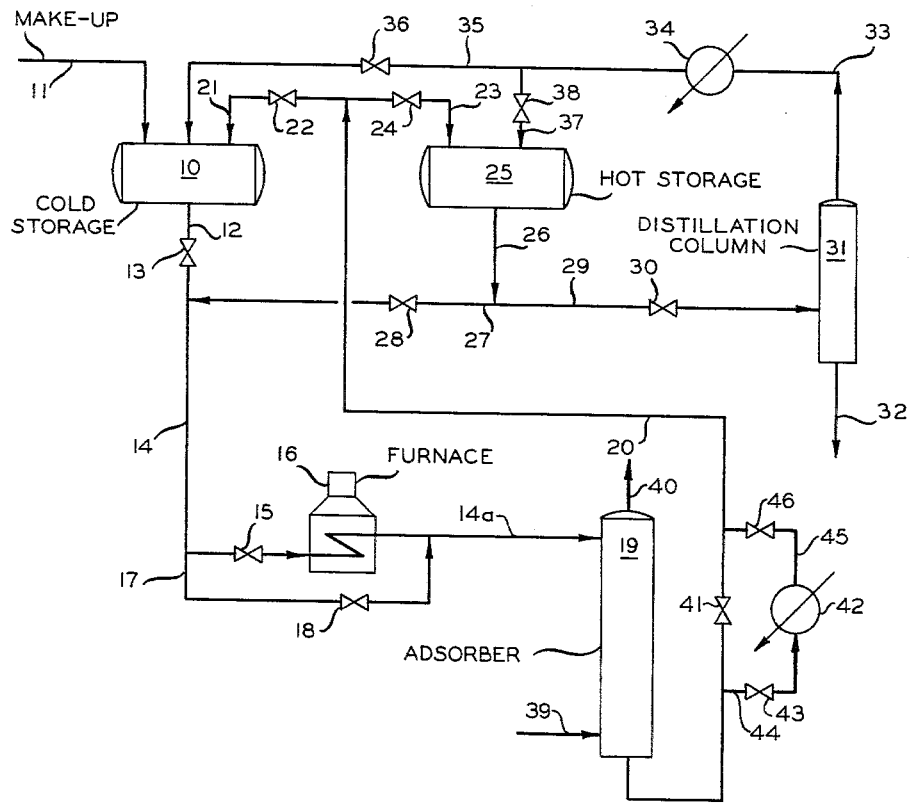

3,208,157
REGENERATION OF ADSORBENTS
Christopher P. Stark, Bartlesville, Okla., assignor to Phillips Petroleum Company, a corporation of Delaware
Filed Sept. 20, 1961, Ser. No. 139,444
4 Claims. (Cl. 34—74)

This invention relates to an improved method of and apparatus for regenerating adsorbents.

Adsorbents are conventionally employed in the separation of fluids. In the petroleum industry, adsorbents are employed to make quantitative separation of aromatics and olefins from the other components of many different feedstocks of wide boiling range.

In the conversion of n-butane to isobutane, for example, it is required that the n-butane feed to the reaction zone be purified. A method of purifying the n-butane feed comprises passing said feed through a molecular sieve bed, a conventional adsorbent. Impurities such as dimethylsulfide are extracted from the feed stream by the molecular sieve. When the molecular sieve becomes saturated with these impurities, it must be regenerated. Conventionally, purified n-butane is passed through the molecular sieve on a once-through basis and the resulting n-butane containing the desorbed impurities is removed from the process.

Obviously, the outlined method of regenerating molecular sieves is wasteful of valuable n-butane. Furthermore, the regeneration process does not provide a method of recovering trace impurities contained in the n-butane feed.

I have discovered an improved method of regenerating adsorbent materials containing adsorbed extract, or adsorbate, wherein a desorbing or stripping fluid is passed through the adsorbent at an elevated temperature until the desorption is complete; the desorbing fluid is recovered and recycled through the adsorbent in subsequent regeneration steps until the desorbing fluid becomes saturated with the adsorbate; and the adsorbate is separated from the desorbing fluid and the desorbing fluid recycled to the adsorbent bed in subsequent regeneration steps.

Accordingly, an object of this invention is to provide an improved method of and apparatus for regenerating adsorbent materials.

Another object of this invention is to provide an improved method of and apparatus for regenerating molecular sieves.

Another object of this invention is to provide an improved method of and apparatus for regenerating molecular sieves employed to remove impurities from n-butane.

Other objects, advantages, and features of my invention will be readily apparent to those skilled in the art from the following description and the appended claims.

Although the invention will hereinafter be described as it applies specifically to the purification of n-butane, it is not intended to limit the invention thereto, as the principles herein disclosed can be applied to the regeneration of other adsorbent materials employing various desorbing fluids. Suitable adsorbents capable of regeneration by the inventive process include silica gel, carbon, and molecular sieves comprising both natural and synthetic crystalline dehydrated zeolite.

The drawing is a schematic representation of the inventive regeneration method.

Suitable stripping or desorbing fluids to be employed in the regeneration of the adsorbent materials are those having the following properties: (1) less strongly adsorbed than the adsorbate, (2) good solubility for the adsorbate, (3) low viscosity, and (4) readily separable by conventional means such as distillation from the adsorbent feed components. Light petroleum solvents such as butane, pentane, hexane, heptane or petroleum ethers are favorable stripping fluids in many applications of desorbing adsorbent materials employed in petroleum refining.

Referring to the drawing, adsorber 19 contains adsorbent material capable of adsorbing impurities such as dimethylsulfide from a n-butane feed, said adsorbent material selected from the group comprising both natural and synthetic crystalline dehydrated zeolites. Suitable materials are the "Molecular Sieves" designated 5A or 13X marketed by Linde Air Products Company, New York 17, New York. N-butane is passed to adsorber 19 via conduit 39, the adsorbent material contained therein extracts the impurities, and a purified (removal of sulfur compounds) n-butane is recovered from adsorber 19 by means of conduit 40.

I have now discovered that at an elevated temperature treated, or purified, n-butane employed to regenerate a molecular sieve material by desorbing the impurities adsorbed thereon is not saturated with impurities after making a single pass through the molecular sieve. I have further discovered that not only can the n-butane be effectively recycled to the molecular sieve material a multiple number of times, but can be stored and employed in subsequent regeneration cycles. As the concentration of impurities builds up in the cycling n-butane, approaching or reaching the saturation level, said impurities can be readily removed by a simple fractionation step.

Referring again to the drawing, treated, or purified, n-butane, maintained at a temperature equal to or below the adsorption temperature (generally ambient), is passed from the cold storage vessel 10 via conduit means 12, valve means 13, conduit means 14 and valve means 15 to a heat exchange means such as a furnace 16. Within furnace 16, the temperature of the n-butane is elevated so that the temperature of the furnace effluent is in the range of 450 to 650° F., and preferably 600° F. Treated n-butane is passed from furnace 16 via conduit means 14a to adsorbent 19, a stripping zone, wherein said treated n-butane is brought into intimate contact with the molecular sieve adsorbent material contained therein.

An n-butane stream containing adsorbate removed from the molecular sieve adsorbent material is withdrawn from adsorber 19 via conduit 20 and passed to a hot storage vessel 25 via valve means 41, 24 and conduit means 23.

n-Butane is recycled to adsorber 19 via conduit means 26, conduit means 27, valve means 28, conduit means 14, valve means 15, furnace 16 and conduit means 14a until regeneration of the molecular sieve adsorbent material is complete. As required, additional treated n-butane is added to the recycle stream via conduit means 12 and valve means 13. The term "regeneration" as herein employed denotes the substantial removal of adsorbate, or adsorbed material, from the adsorbent material.

After regeneration of the molecular sieve material is complete, the desired adsorption temperature in adsorber 19 is obtained by passing n-butane from the cold storage vessel 10 via conduit means 12, valve means 13, conduit means 14, conduit means 17, valve means 18 and conduit means 14a to adsorber 19. The cooling n-butane is withdrawn from adsorber 19 by means of conduit 20 and returned to cold storage vessel 10 via valve means 41, conduit means 21 and valve means 22. It is within the scope of this invention to provide a means of cooling the n-butane stream withdrawn from adsorber 19 by passing said withdrawn stream through conduit means 44, valve means 43, cooling means 42, conduit means 45 and valve means 46.

Following a subsequent adsorption step wherein adsorbate is again adsorbed on the molecular sieve material, n-butane is passed through adsorber 19 via conduit means 26, conduit means 27, valve means 28, conduit means 14, valve means 15, heat exchange means 16 and conduit means 14a in a second or subsequent regeneration step. The desorbing n-butane is withdrawn from adsorber 19 via conduit means 20 and recycled to hot storage vessel 25 via valve means 41, 24 and conduit means 23 as in the previous or first regeneration step procedure. The temperature of adsorber 19 is returned to the adsorption temperature by passing n-butane from cold storage vessel 10 to adsorber 19 via conduit means 12, valve means 13, conduit means 14, conduit means 17, valve means 18 and conduit means 14a. Make-up n-butane, as required, is added to the regeneration system via conduit means 11.

The adsorbate is separated from the n-butane desorbing fluid by passing a mixture thereof from hot storage vessel 25 via conduit means 26, conduit means 29 and valve means 30 to distillation column 31. Impurities (dimethylsulfide) are withdrawn from distillation column 31 via conduit means 32. Purified n-butane is withdrawn from the upper region of distillation column 31 via conduit means 33, via heat exchange means 34, and passed to cold storage vessel 10 via conduit means 35 and valve means 36. If desired, the purified n-butane can be recycled to hot storage vessel 25 via conduit means 37 and valve means 38.

It is within the scope of this invention to cool the desorbing n-butane stream withdrawn from adsorber 19 by passing said withdrawn desorbing stream via conduit means 44, valve means 43 to cooling means 42.

As herein illustrated the same fluid employed in the desorbing step has been employed in the cooling step. It is not intended to so limit the invention. Different fluids can be employed in the desorption and cooling steps, preferably employing the fluid treated by the adsorbent material as the cooling fluid. Other means, such as cooling coils placed in the adsorbent material, can be employed to cool the adsorbent material and are within the scope of this invention.

It will be understood by those skilled in the art that the means of transferring the desorbing fluid will be dependent upon whether the desorbing fluid is a vapor or a liquid. It will also be understood by those skilled in the art that positioning of the feed and product withdrawal conduits of vessels 10 and 25 will be dependent upon whether the desorbing and cooling fluids are gaseous or liquid.

The following example is presented as illustrative of the inventive process.

*Example*

Referring to the drawing, cold storage vessel 10 contains 2250 gallons of n-butane at approximately ambient temperature. The furnace 16 and piping contain 820 gallons, and an additional 850 gallons of n-butane are stored in hot storage vessel 25. During the regeneration of the molecular sieve material (Linde–5A) in a bed of 900 gallon capacity (interstices), n-butane is withdrawn from the hot storage vessel 25 at the rate of 1350 gallons per hour, passed through the furnace 16, raising the temperature of the n-butane to approximately 600° F., and then passed through the adsorbent bed and adsorber 19. The desorbing n-butane is then returned to the hot storage vessel 25. The hot n-butane is recirculated through furnace 16 and the adsorbent bed in adsorber 19, maintaining the temperature of the circulating stream at 600° F. by the furnace 16 for a period of approximately 4 to 6 hours after the system has attained a regeneration temperature of 600° F. (1 to 2 hours).

When regeneration of the molecular sieve material in the adsorbent bed is completed, furnace 16 is bypassed and the temperature is permitted to drop to about 570° F. whereupon valves 28 and 15 are closed and valves 13 and 18 are opened. The adsorbent bed is thereby purged with cool, purified n-butane from cold storage vessel 10. The purified cooling n-butane is removed from adsorber 19 via conduit 20 and returned to cold storage 10.

As will be evident to those skilled in the art, various modifications of this invention can be made, or followed, in the light of the foregoing disclosure and discussion without departing from the spirit or scope thereof.

I claim:

1. Apparatus comprising, in combination, an adsorption vessel containing an adsorbent, a first storage vessel, first conduit means communicating between said adsorption vessel and said first storage vessel, a heat exchange means, second conduit means communicating between said first storage vessel and said heat exchange means, third conduit means communicating between said heat exchange means and said adsorption vessel, a second storage vessel, fourth conduit means communicating between said first conduit means and said second storage vessel, a distillation vessel, fifth conduit means communicating between said second conduit means and said distillation vessel, sixth conduit means communicating between said distillation vessel and said first storage vessel, means of cooling a fluid flowing through said sixth conduit means, and seventh conduit means communicating between said second storage vessel and said second conduit means.

2. The apparatus of claim 1 to include a means of cooling a fluid flowing through said fourth conduit means.

3. Apparatus of claim 2 to include a means of cooling a fluid flowing through said first conduit means.

4. The apparatus of claim 2 wherein said adsorbent is selected from a group consisting of natural and synthetic crystalline dehydrated zeolites.

References Cited by the Examiner

UNITED STATES PATENTS

| | | | |
|---|---|---|---|
| 2,689,208 | 9/54 | Murry et al. | 208—140 |
| 2,754,344 | 7/56 | Weatherly | 252—214 |
| 2,847,485 | 8/58 | Fear | 208—305 |
| 2,908,639 | 10/59 | Carter et al. | 208—305 |
| 3,117,095 | 1/64 | Brown et al. | 252—305 |

MAURICE A. BRINDISI, *Primary Examiner.*